(12) United States Patent
Li

(10) Patent No.: US 11,334,937 B2
(45) Date of Patent: *May 17, 2022

(54) DISPLAYING AN ONLINE PRODUCT ON A PRODUCT SHELF

(71) Applicant: Advanced New Technologies Co., Ltd., Grand Cayman (KY)

(72) Inventor: Jie Li, Hangzhou (CN)

(73) Assignee: Advanced New Technologies Co., Ltd., Grand Cayman (KY)

(*) Notice: Subject to any disclaimer, the term of this patent is extended or adjusted under 35 U.S.C. 154(b) by 0 days.

This patent is subject to a terminal disclaimer.

(21) Appl. No.: 17/339,717

(22) Filed: Jun. 4, 2021

(65) Prior Publication Data

US 2021/0295420 A1    Sep. 23, 2021

Related U.S. Application Data

(63) Continuation of application No. 16/941,098, filed on Jul. 28, 2020, now Pat. No. 11,030,679, which is a
(Continued)

(30) Foreign Application Priority Data

Dec. 23, 2015 (CN) .......................... 201510982403.5

(51) Int. Cl.
*G06Q 30/06* (2012.01)
*G06F 16/958* (2019.01)

(52) U.S. Cl.
CPC ....... *G06Q 30/0641* (2013.01); *G06F 16/958* (2019.01); *G06Q 30/0631* (2013.01); *G06Q 30/0623* (2013.01)

(58) Field of Classification Search
CPC .. G06Q 30/06–0645; G06F 3/012–013; G06F 16/24; G06F 16/2453;
(Continued)

(56) References Cited

U.S. PATENT DOCUMENTS

| 10,726,474 | B2 | 7/2020 | Li |
| 2007/0133842 | A1 | 6/2007 | Harrington |

(Continued)

FOREIGN PATENT DOCUMENTS

| CN | 1996363 | 7/2007 |
| CN | 101087439 | 12/2007 |

(Continued)

OTHER PUBLICATIONS

Crosby et al., "BlockChain Technology: Beyond Bitcoin," Sutardja Center for Entrepreneurship & Technology Technical Report, Oct. 16, 2015, 35 pages.
(Continued)

*Primary Examiner* — William J Allen
(74) *Attorney, Agent, or Firm* — Fish & Richardson P.C.

(57) ABSTRACT

Online products and priorities of the online products are obtained, where the online products are waiting to be displayed on a product shelf. The product shelf includes at least two display slots, where each display slot of the at least two display slots displays one online product. An attention ranking of each display slot is determined based on a distance between each display slot and a visual center of the product shelf. An online product is displayed with a higher obtained priority in a particular display slot with a greater determined attention ranking.

20 Claims, 9 Drawing Sheets

Related U.S. Application Data continuation of application No. 16/015,818, filed on Jun. 22, 2018, now Pat. No. 10,726,474, which is a continuation-in-part of application No. PCT/CN2016/109556, filed on Dec. 13, 2016.

(58) Field of Classification Search
CPC .... G06F 16/2455; G06F 16/248; G06F 16/33; G06F 16/3331; G06F 16/338; G06F 16/34; G06F 16/43; G06F 16/438; G06F 16/53; G06F 16/538; G06F 16/63; G06F 16/638; G06F 16/64; G06F 16/73; G06F 16/738; G06F 16/74; G06F 16/83; G06F 16/838; G06F 16/903; G06F 16/9038; G06F 16/904; G06F 16/95; G06F 16/953; G06F 16/9535; G06F 16/9538
See application file for complete search history.

(56) References Cited

U.S. PATENT DOCUMENTS

| | | | |
|---|---|---|---|
| 2009/0067747 | A1 | 3/2009 | Inamoto et al. |
| 2009/0138817 | A1 | 5/2009 | Oron et al. |
| 2010/0250336 | A1 | 9/2010 | Selinger et al. |
| 2012/0036037 | A1 | 2/2012 | Xiao et al. |
| 2014/0257970 | A1 | 9/2014 | Shimora |
| 2014/0258849 | A1 | 9/2014 | Chung et al. |
| 2015/0264299 | A1 | 9/2015 | Leech et al. |
| 2018/0189823 | A1* | 7/2018 | Xie ................... G06Q 30/0246 |
| 2018/0300789 | A1 | 10/2018 | Li |
| 2020/0357044 | A1 | 11/2020 | Li |

FOREIGN PATENT DOCUMENTS

| | | |
|---|---|---|
| CN | 102346894 | 2/2012 |
| CN | 103810216 | 5/2014 |
| CN | 104915837 | 9/2015 |
| CN | 105550923 | 5/2016 |
| JP | 2007122101 | 5/2007 |
| JP | 2007183863 | 7/2007 |
| JP | 2008072446 | 3/2008 |
| JP | 2009069365 | 4/2009 |
| JP | 2010014927 | 1/2010 |
| JP | 2014174806 | 9/2014 |
| KR | 20120085707 | 8/2012 |
| WO | WO 2007091259 | 8/2007 |
| WO | WO 2010141637 | 12/2010 |

OTHER PUBLICATIONS

Effects of Product Placement in On-Line Games on Brand Memory: A Perspective of the Limited-Capacity Model of Attention Article in Journal of Advertising. Mira Lee. Ronald J Faber, Dec. 2007.

Extended European Search Report issued in EP Application No. 16877608.6 dated Aug. 16, 2018; 7 pages.

Hijikata, "Techniques of Preference Extraction for Information Recommendation," Journal of the Information Processing Society of Japan, Apr. 2006, 47(4):29 pages (with Machine Translation).

International Preliminary Report on Patentability in International Application No. PCT/CN2016/109556 dated Jun. 26, 2018; 11 pages (with English translation).

International Search Report by the International Searching Authority issued in International Application No. PCT/CN2016/109556 dated Feb. 24, 2017; 10 pages.

Lagrone: "Chapter 4. Using Responsive Frameworks (Fluid layout using the rule of thirds)" In: "HTML5 and CSS3 Responsive Web Design Cookbook", May 23, 2013; 13 pages.

Nakamoto, "Bitcoin: A Peer-to-Peer Electronic Cash System," www.bitcoin.org, 2005, 9 pages.

* cited by examiner

| | TOP | | |
|---|---|---|---|
| 1 | 2 | 3 | |
| 4 | 5 | 6 | PRODUCT CATEGORY |
| 7 | 8 | 9 | |
| | BOTTOM | | |

FIG. 1

DISPLAYING AN ONLINE PRODUCT ON A PRODUCT SHELF

This application is a continuation of and claims the benefit of priority of U.S. patent application Ser. No. 16/941,098, filed Jul. 28, 2020, which is a continuation of U.S. patent application Ser. No. 16/015,818, filed Jun. 22, 2018, now U.S. Pat. No. 10,726,474, which is a continuation of PCT Application No. PCT/CN2016/109556, filed on Dec. 13, 2016, which claims priority to Chinese Patent Application No. 201510982403.5, filed on Dec. 23, 2015, and each application is hereby incorporated by reference in its entirety.

TECHNICAL FIELD

The present disclosure relates to the field of Internet technologies, and in particular, to a method and an apparatus for displaying an online product on a product shelf.

BACKGROUND

With development of Internet technologies and terminal device technologies, more companies sell their products or services through a network. In an e-commerce website or an e-commerce application (APP), an operator displays an online product on a product shelf for a user to browse and purchase.

An online product is a virtual product corresponding to an actual product or service, and an attribute of the online product includes a name, brief introduction, a logo, charging information, etc. A product shelf is a virtual interface for displaying an online product, and describes how online products are displayed to a user. The product shelf generally includes several display slots, and each display slot displays one online product. Different arrangements of the display slots form different product shelves such as a nine-rectangular-grid product shelf in which display slots are arranged in three rows and three columns and an eight-rectangular-grid product shelf in which display slots are arranged in two rows and four columns.

In the existing technology, in an e-commerce website or an e-commerce application, a fixed product shelf is used for all users, and online products are successively displayed on the product shelf from top to bottom and from left to right based on priorities of the online products. For example, in a 3×3 nine-rectangular-grid product shelf, arrangement of the online products on the product shelf is shown in FIG. 1. In an application scenario in which a user searches for online products, priorities of the online products are determined based on a matching degree of a user requirement. As such, an online product best matching the user requirement is displayed in an upper left corner of the product shelf, and this location usually does not attract attention of the user well. The online product best matching the user's need may be easily ignored, which affects the quality of the user's search results, and reduces the user's efficiency of obtaining online products that are needed.

SUMMARY

In view of this, the present disclosure provides a method for displaying an online product on a product shelf, where the product shelf includes at least two display slots, each display slot displays one online product, and the method includes: obtaining online products waiting to be displayed and priorities of the online products; and displaying an online product with a higher priority on a display slot with a higher attention ranking position based on attention ranking of the display slots on the product shelf, the attention ranking of the display slots being determined based on a distance between a display slot and a visual center of the product shelf, and the visual center of the product shelf being a golden section point in an upper left corner of a product shelf display area.

The present disclosure further provides an apparatus for displaying an online product on a product shelf, where the product shelf includes at least two display slots, each display slot displays one online product, and the apparatus includes: a product priority obtaining unit, configured to obtain online products waiting to be displayed and priorities of the online products; and a product display unit, configured to display an online product with a higher priority on a display slot with a higher attention ranking position based on attention ranking of the display slots on the product shelf, the attention ranking of the display slots being determined based on a distance between a display slot and a visual center of the product shelf, and the visual center of the product shelf being a golden section point in an upper left corner of a product shelf display area.

It can be seen from the earlier described technical solutions that in the implementations of the present disclosure, the attention ranking of the display slots is determined based on the distance between the display slot and the visual center of the product shelf, and the online product with the higher priority is displayed in the display slot with a higher attention ranking position on the product shelf. When applied to a user's search scenario, the technical solutions can display an online product better matching a user requirement in a location attracting more attention of the user, so that the user can more quickly find a needed online product. It improves the user's search efficiency, and improves a search result.

BRIEF DESCRIPTION OF DRAWINGS

Figure 1:
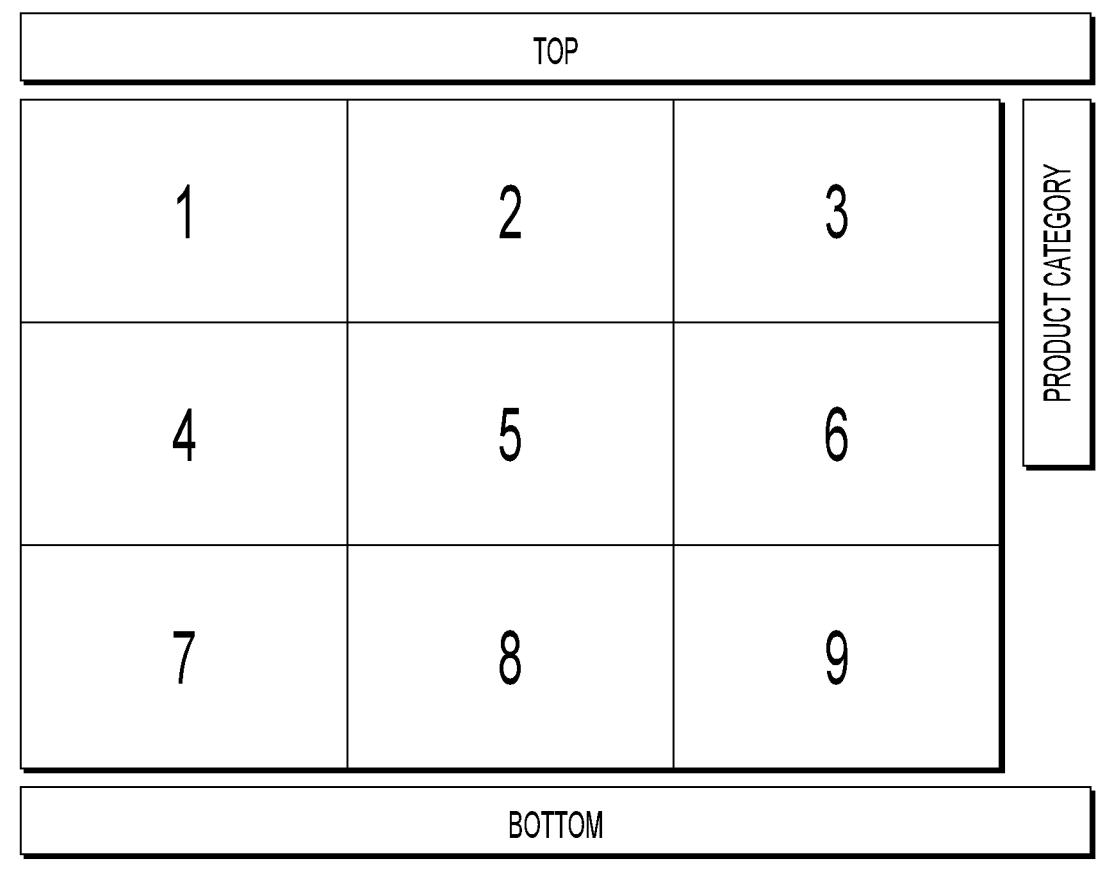

FIG. 1 is a schematic diagram of ranking of online products displayed on a product shelf in the existing technology;

DESCRIPTION OF IMPLEMENTATIONS

A person's field of vision is an area within two overlapped circles with different centers. When looking straight, the centers of two eyes' focuses reside on the two golden section points of the total length of the eyes' field-of-vision. Due to physiological characteristics of the human eyes, when a person looks at an object, a line of sight usually first falls in a location meeting a golden section ratio on the object.

Figure 2:
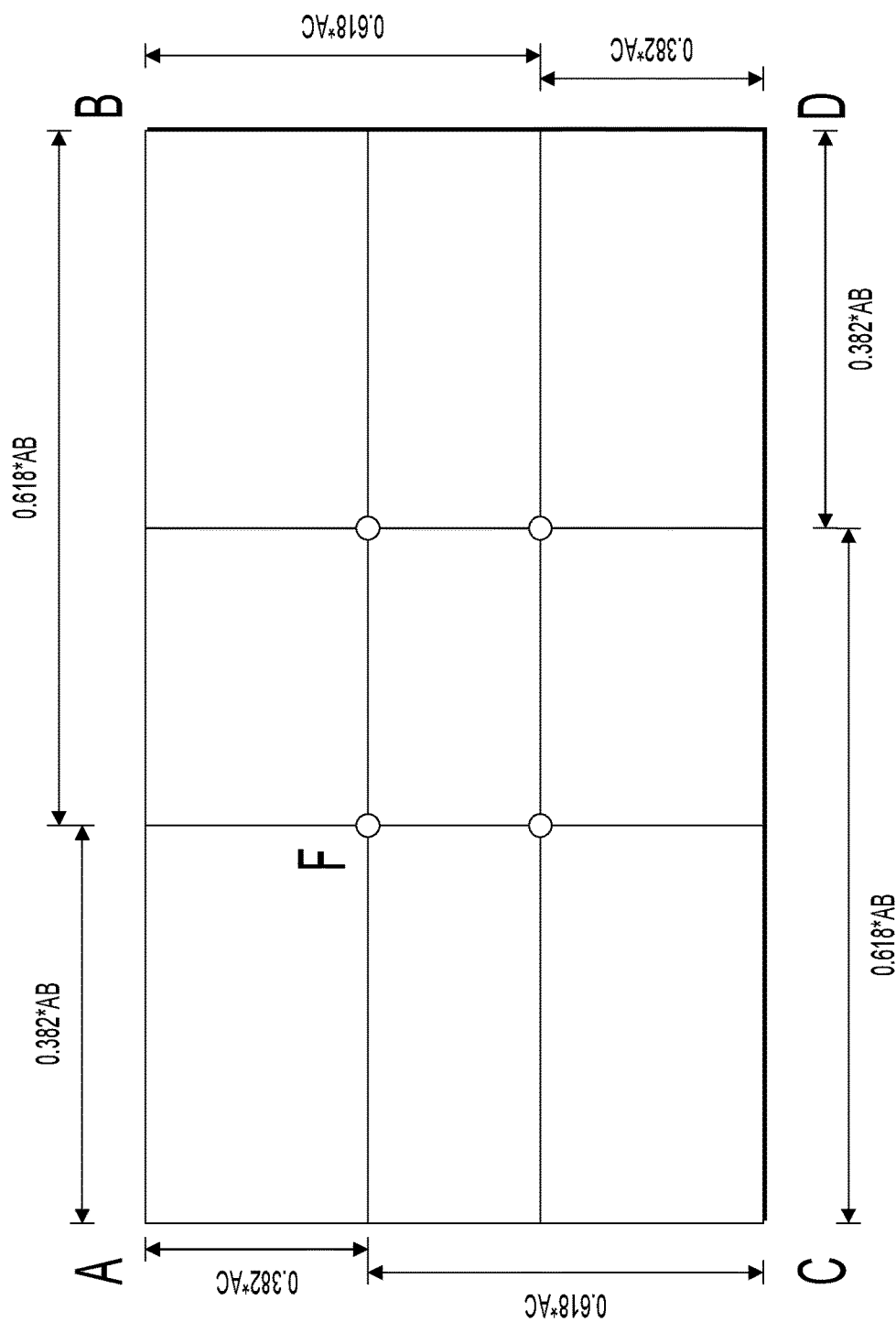
FIG. 2 is a schematic diagram of a golden section point of a rectangle.

Referring to FIG. 2, for a rectangular observation object, assume that the four corner points of the rectangle are respectively A, B, C, and D. Two vertical section lines can be respectively drawn in a location on a line segment AB with a distance of 0.382×AB from a point A and in a location on the line segment AB with a distance of 0.618×AB from the point A. Two horizontal section lines can be respectively drawn in a location on a line segment AC with a distance of 0.382×AC from point A and in a location on the line segment AC with a distance of 0.618×AC from point A. Four intersection points of the four section lines are four golden section points of the rectangle. More details can be referred to in FIG. 2. When a person views the rectangle, a line of sight usually first falls on the golden section point in the upper left corner (point F in FIG. 2). The distance between the point and a left border of the rectangle is 0.382×AB, and the distance between the point and a right border of the rectangle is 0.618×AB. The ratio (0.382×AB)/(0.618×AB) of the distance between the point and the left border of the rectangle to the distance between the point and the right border of the rectangle equals the golden section ratio 0.618. The ratio of a distance between the point and a top border of the rectangle to the distance between the point and a bottom border of the rectangle is also the golden section ratio.

A product shelf is usually displayed to a user in a rectangular display area. When the user views the product shelf, a golden section point in an upper left corner of the rectangular display area of the product shelf is usually within an initial visual center of the user. Therefore, an online product with a higher priority can be placed in a location closer to the initial visual center of the user based on such visual characteristic of the human eyes, so that the user can first notice the online product with higher priority.

The implementations of the present disclosure provide new methods for displaying online products on a product shelf. Attention ranking of display slots is generated based on a distance between the display slot and the visual center of the rectangular display area of the product shelf. When online products are displayed on the product shelf, matching is performed between priorities of the online products and the attention ranking of the display slots, so that the user can first notice an online product with a higher priority. When the method is applied to a search scenario, the user can more quickly obtain a search result. It improves the user's search efficiency, and resolves a problem in the existing technology.

In e-commerce, a user can obtain related information of an online product from a server by performing an operation on a client software, and perform various transaction-related functions through interaction with the server, for example, searching for an online product, viewing online product details, placing orders, payment, etc. In this implementation of the present disclosure, the client software and the server are accessible to each other through a network. The client software can run on a terminal device such as a mobile phone, a tablet computer, a personal computer (PC), or a notebook computer, or can run on a physical or logical server. The server usually can function as physical or logical server. The types of devices on the client side or the server side, and the types, protocols, etc. of communications networks between the client and the server are not limited in this implementation of the present disclosure.

Figure 3:
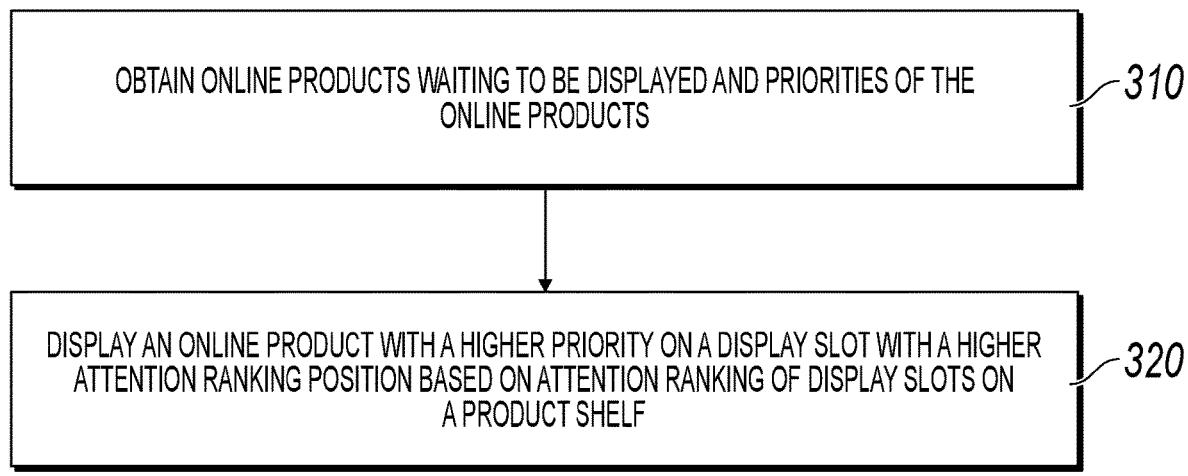
FIG. 3 is a flowchart illustrating a method for displaying an online product on a product shelf, according to an implementation of the present disclosure.

In this implementation of the present disclosure, the method for displaying online products on a product shelf is applied to the client software, and a procedure of the method is shown in FIG. 3.

Step 310: Obtain online products waiting to be displayed and priorities of the online products.

When the client software accesses an online product display page, for example, the client software accesses an online product search result page, the client software opens a link with online product display, etc., the server sends an online product related to a client software request and a priority of the online product to the client software.

A priority can be considered as importance ranking of online products returned by the server. In different application scenarios, the server usually determines priorities of the online products based on different ranking criteria. For example, the server can establish a mathematical model based on data mining, machine learning, and big data analytics, and use the established mathematical model for importance ranking of the online products, so as to improve hits and sales of the online products. As another example, in response to a user's search request, the server can analyze a user preference, and perform importance ranking on online products satisfying a user's search purpose based on a degree of matching of the user's preference and by using the established mathematical model. The server can use default ranking of online products of a merchant as priorities of the online products. Ranking of priorities can be referred to in existing technologies. Details are not described again. A method for determining the priorities of the online products is not limited in this implementation of the present disclosure.

Step 320: Display an online product with a higher priority on a display slot with a higher attention ranking position based on attention ranking of display slots on a product shelf.

Attention ranking of the display slots is used to describe a degree that each display slot on a product shelf with a determined arrangement structure of the display slots attracts attention. A display slot with a higher attention ranking position is more quickly or easily seen by a user viewing the product shelf.

In this implementation of the present disclosure, a golden section point in an upper left corner of a rectangular display area of the product shelf is referred to as a visual center of the product shelf. The ratio of the distance between the point and the top border of the display area of the product shelf to the distance between the point and the bottom border of the display area of the product shelf is the golden section ratio, and the ratio of the distance between the point and the left border of the display area of the product shelf to the distance between the point and the right border of the display area of the product shelf is also the golden section ratio. As described above, when the user views the product shelf displayed on a screen, a line of sight usually first falls on the visual center of the product shelf, and an online product closer to the visual center of the product shelf is more likely to first fall within a reachable range of the user's line of sight. Therefore, in this implementation of the present disclosure, the attention ranking of the display slots is determined based on the distance between each display slot and the visual center of the product shelf.

A fixed point in a rectangular display area of each display slot can be selected based on actual application scenarios, and a distance between the fixed point and the visual center of the product shelf can be used as the distance between the display slot and the visual center of the product shelf. For example, the fixed point may be an upper left vertex of each display slot, a geometric center of each display slot (that is, an intersection point of two diagonals in the rectangular display area of the display slot), or a visual center of each display slot.

In addition to the distance between the display slot and the visual center of the product shelf, when attention ranking of display slots on a product shelf of certain structure is determined, other factors can also be considered, for example, habit of viewing the screen, the order of changing line of sight, etc., so as to reflect influences of these factors on user attention.

In an implementation, the attention ranking of the display slots can be determined based on the distance between the display slot and the visual center of the product shelf and a degree of attention paid to the display slot on the product shelf. The degree of attention paid to the display slot on the product shelf can be determined based on objective influences of the factors considered on the user's attention and locations of the display slots on the product shelf. For example, if the user's viewing habit is a factor considered, because the user is usually more accustomed to viewing the screen from left to right, a degree of attention paid to a display slot on the left can be higher than that of a display slot on the right. If user's line-of-sight conversion is considered, because horizontal line-of-sight conversion is better than vertical line-of-sight conversion, a degree of attention paid to a display slot on the right can be higher than that of a display slot at the bottom.

In an example, the degree of attention paid to the display slot on the product shelf can be obtained based on experimental data. For a product shelf with a determined arrangement structure of display slots, the observing sequence of the same or different online products on each display slot can be tested using several experimenters to obtain experimental data. Such experimental data can usually reflect objective influences of various factors on the user attention. After the experimental data is obtained, a first reference value of each display slot can be determined based on the distance between the display slot and the visual center of the product shelf. A second reference value of each display slot can be obtained based on experimental data of the degree of attention paid to the display slot on the product shelf. The display slots can be ranked based on a weighted sum of the first reference value and the second reference value of each display slot to determine the attention ranking of the display slots.

The first reference value may be the distance between the display slot and the visual center of the product shelf or a function of the distance, or may be first ranking obtained based on the distance between the display slot and the visual center of the product shelf. The second reference value may be a value obtained based on the experimental data, or may be second ranking of the display slot based on the value. Weight setting for the first reference value and the second reference value can be selected based on an actual application scenario. Forms and weight settings for the first reference value and the second reference value are not limited in this implementation of the present disclosure.

In an actual application scenario, the attention ranking of the display slots on the product shelf can be determined on the client software, or can be determined on the server. For example, if a product shelf of one or more fixed arrangement structures of the display slots is used on the client software, the client software can calculate and store various types of attention ranking of the display slots during installation. The various types of attention ranking can be directly invoked or one of them can be invoked during each use. If arrangement of the display slots on the product shelf used by the client software frequently changes, the client software can calculate attention ranking of display slots on the product shelf waiting to be used before each use. As another example, the server can first calculate attention ranking of display slots on several product shelves that may be used by the client software. The server delivers the attention ranking to the client software, and the client software invokes the attention ranking of the display slots corresponding to the product shelf during use. When sending online products waiting to be displayed to the client software, the server can specify attention ranking of display slots on a product shelf for displaying these online products.

In existing technology, in an e-commerce website or an e-commerce application, a fixed arrangement structure of the display slots is usually used for all product shelves of the client software. With more types of client devices that run the client software, display types of the client devices also varies. An arrangement structure of the display slots suitable for one display may have a poor display effect on another display.

To avoid such case, in this implementation of the present disclosure, an arrangement structure of the display slots on the product shelf can be determined based on an aspect ratio of a display screen. The aspect ratio of the display screen is a ratio of a width to a height of the display screen, and common aspect ratios are 4:3 (1.33), 16:9 (1.78), 16:10 (1.6), etc.

When the aspect ratio of the display screen falls within a certain range, product shelves of the same arrangement structure of the display slots can have similar display effects. Therefore, a display screen with aspect ratio within a certain range can correspond to a product shelf of an arrangement structure. For example, when the aspect ratio of the display screen is within a first ratio range, the display slots can be arranged using a 3×3 nine-rectangular-grid product shelf. When the aspect ratio of the display screen is within a second ratio range, the display slots can be arranged using a 2×4 eight-rectangular-grid product shelf. When the aspect ratio of the display screen is neither within the first ratio range nor the second ratio range, the display slots are arranged using a 3×2 six-rectangular-grid product shelf. The first ratio range and the second ratio range do not overlap.

In an actual application scenario, the arrangement structure of the display slots on the product shelf can be determined on the client software, or can be determined on the server. For example, in a client software installation process, an installation program can select and store an arrangement structure of the display slots that is suitable for the display screen of the device including the client software, and the client software can directly use the arrangement structure for displaying the online products. Alternatively, before each use of the product shelf, the client software can determine the arrangement structure of the display slots based on the aspect ratio of the display screen of the device. As another example, when the client software establishes a connection to the server, or requests online products from the server, the client software reports information about its display screen (such as a resolution or an aspect ratio). When sending the online product, the server can specify the arrangement structure of the display slots on the product shelf used by the client software.

It can be seen that in this implementation of the present disclosure, the attention ranking of the display slots is generated based on the distance between the display slot and the visual center of the rectangular display area of the product shelf. When the online products are displayed, the online product with the higher priority is placed in the display slot with a higher attention ranking position. When the method is applied to a search scenario, the user can notice an online product better matching a user requirement in a location that can attract more attention of the user, so that the user can more quickly obtain a search result, which improves the user's search efficiency.

In an implementation of the present disclosure, three types of attention ranking of the display slots on a product shelf of different arrangement structures of the display slots are predetermined on the client software. Attention ranking of the display slots of each arrangement structure is generated in the following way: The display slots are ranked based on the distance between the geometric center of the display slot and the visual center of the product shelf, to obtain the first ranking of each display slot. The second ranking of each display slot is obtained based on the experimental data of the degree of attention paid to the display slot on the product shelf. The display slots are ranked based on a weighted sum of the first ranking and the second ranking of each display slot to obtain the attention ranking of the display slots.

Figure 4:
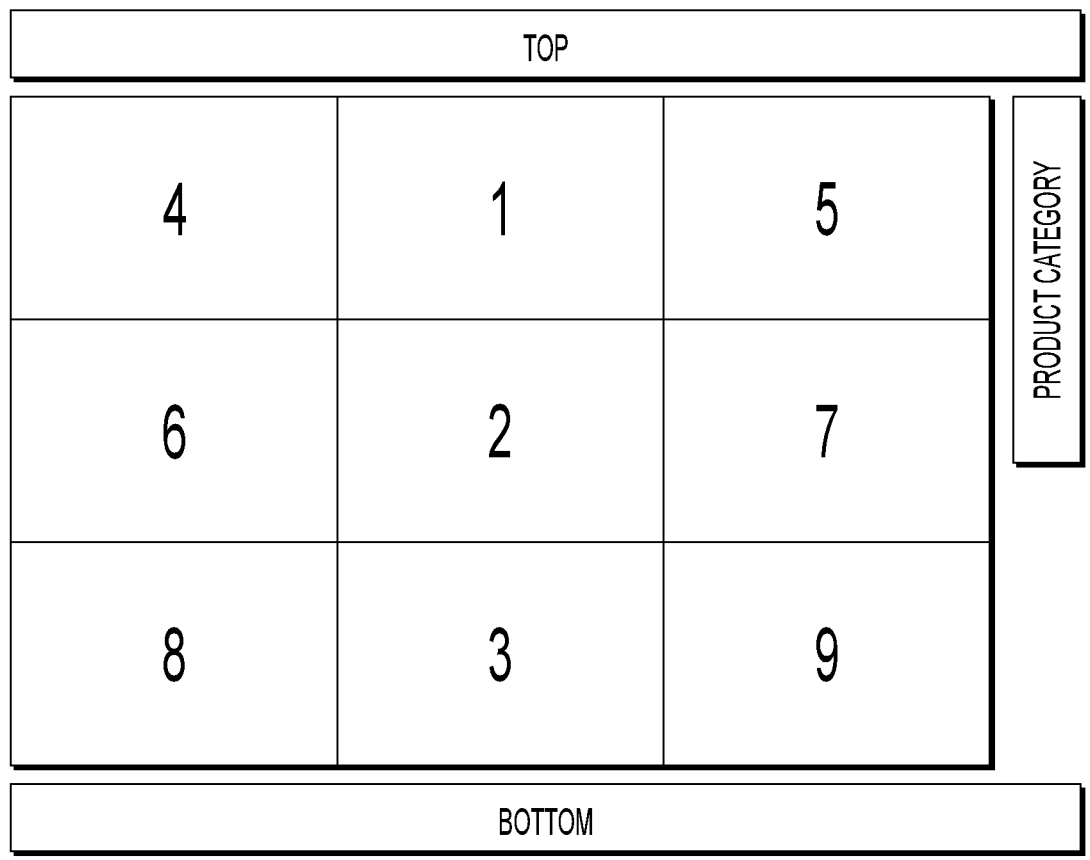
FIG. 4 is a schematic diagram of attention ranking of display slots on a nine-rectangular-grid product shelf, according to an implementation of the present disclosure.

Referring to FIG. 4, a first product shelf is a nine-rectangular-grid product shelf in which the display slots are arranged in three rows and three columns. The display slots ranked in descending order of attention are: a display slot of row 1 and column 2, a display slot of row 2 and column 2, a display slot of row 3 and column 2, a display slot of row 1 and column 1, a display slot of row 1 and column 3, a display slot of row 2 and column 1, a display slot of row 2 and column 3, a display slot of row 3 and column 1, and a display slot of row 3 and column 3.

Figure 5:
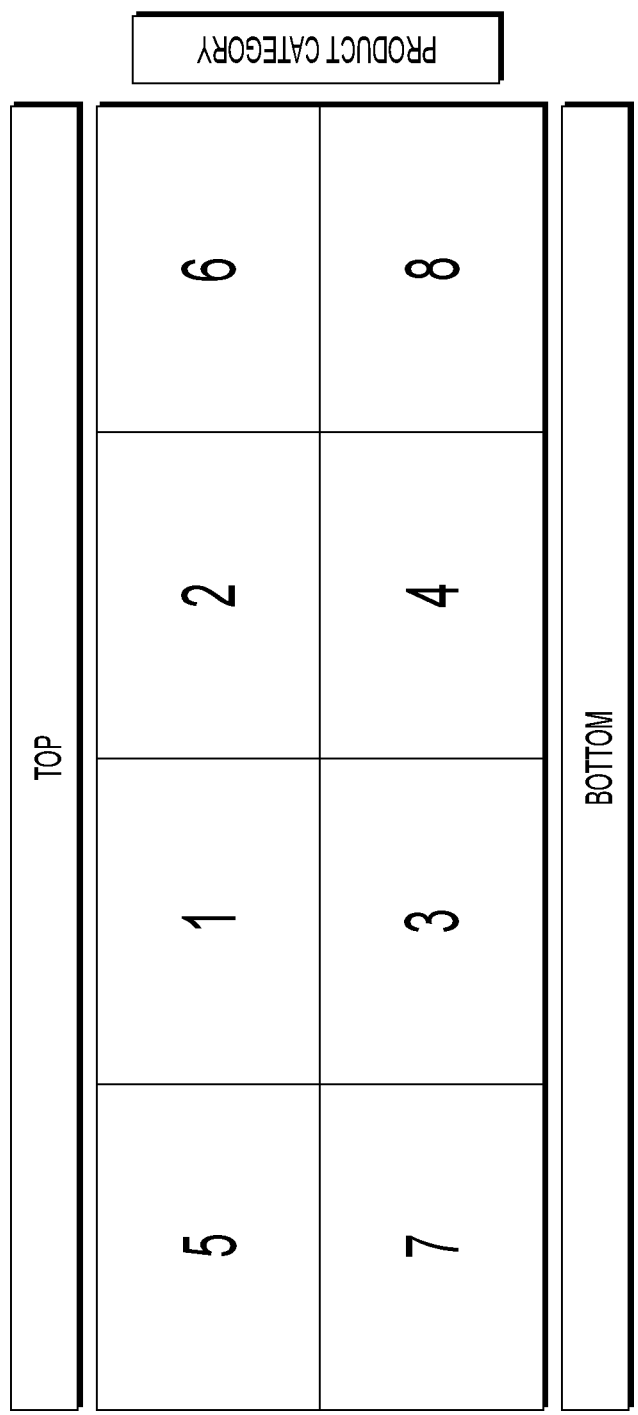
FIG. 5 is a schematic diagram of attention ranking of display slots on an eight-rectangular-grid product shelf, according to an implementation of the present disclosure.

Referring to FIG. 5, a second product shelf is an eight-rectangular-grid product shelf in which the display slots are arranged in two rows and four columns. The display slots ranked in descending order of attention are: a display slot of row 1 and column 2, a display slot of row 1 and column 3, a display slot of row 2 and column 2, a display slot of row 2 and column 3, a display slot of row 1 and column 1, a display slot of row 1 and column 4, a display slot of row 2 and column 1, and a display slot of row 2 and column 4.

Figure 6:
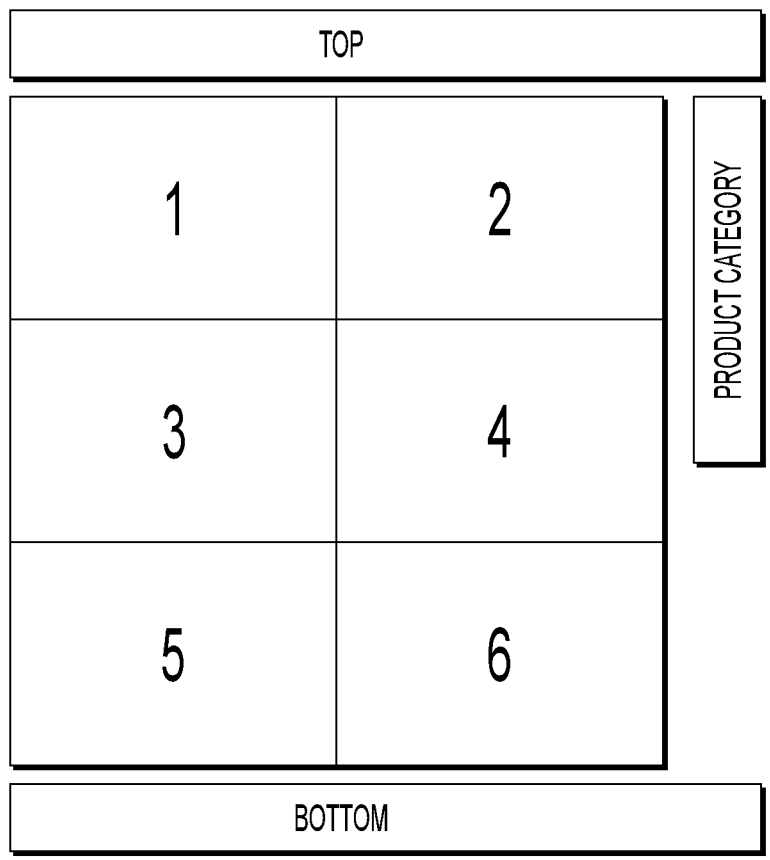
FIG. 6 is a schematic diagram of attention ranking of display slots on a six-rectangular-grid product shelf, according to an implementation of the present disclosure.

Referring to FIG. 6, a third product shelf is a six-rectangular-grid product shelf in which the display slots are arranged in three rows and two columns. The display slots ranked in descending order of attention are: a display slot of row 1 and column 1, a display slot of row 1 and column 2, a display slot of row 2 and column 1, a display slot of row 2 and column 2, a display slot of row 3 and column 1, and a display slot of row 3 and column 2.

When the client software accesses a page displaying the online products, the client software receives the online products waiting to be displayed and the priorities of the online products that are delivered by the server.

The client software reads the resolution of the display screen of the device, calculates the aspect ratio of the display screen (that is, the width of the display screen divided by the height of the display screen), and determines the arrangement structure of the display slots on the product shelf based on Table 1.

TABLE 1

| Aspect ratio t of the display screen | Arrangement structure of the display slots |
| --- | --- |
| $1.3 \le t < 1.45$ | Nine-rectangular-grid product shelf in which the display slots are arranged in three rows and three columns |
| $t \ge 1.45$ | Eight-rectangular-grid product shelf in which the display slots are arranged in two rows and four columns |
| $T < 1.3$ | Six-rectangular-grid product shelf in which the display slots are arranged in three rows and two columns |

After determining the arrangement structure of display slots on the product shelf waiting to be used, based on predetermined attention ranking of the display slots that corresponds to the arrangement structure, the client software displays the online product with the highest priority on a display slot with the highest attention ranking position, and displays the online product with the second highest priority on a display slot with the second highest attention ranking position, and so on.

If a number of online products delivered by the server exceeds a number of display slots, after the user flips the page, online products on the next page are still displayed based on attention ranking of display slots and priorities of the online products by using the earlier described method.

Figure 7:
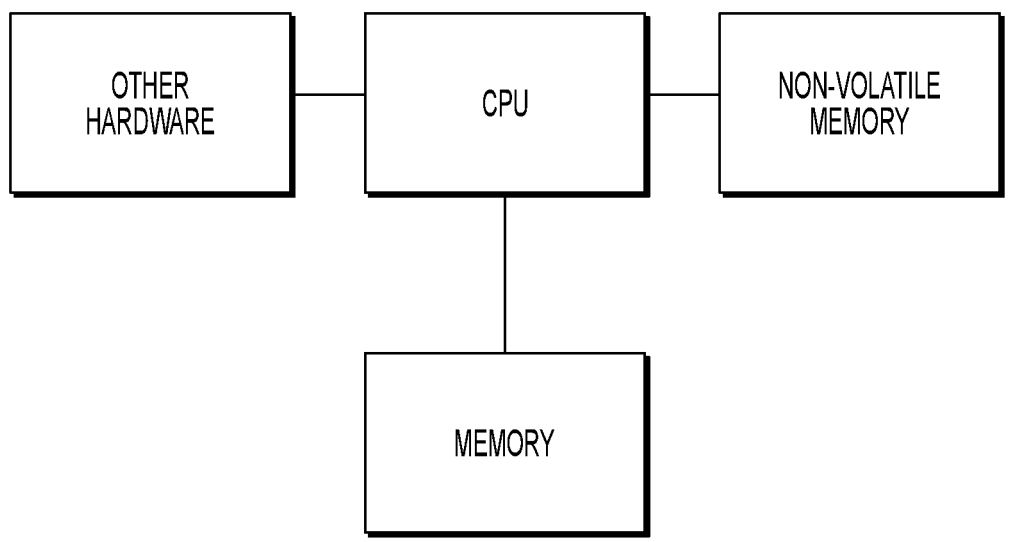
FIG. 7 is a structural diagram of hardware of a device suitable for an implementation of the present disclosure.

Corresponding to the earlier described procedure, an implementation of the present disclosure can further provide an apparatus for displaying an online product on a product shelf. The apparatus can be implemented by software, hardware, or a combination of hardware and software. In an example that the apparatus is implemented by software, the apparatus in logic sense is formed after a central process unit (CPU) of a device reads a corresponding computer program instruction to a memory for running. In terms of hardware, in addition to a CPU, a memory, and a non-volatile memory shown in FIG. 7, the device that includes the apparatus for displaying an online product on a product shelf generally further includes other hardware such as a chip for receiving and sending a wireless signal, or other hardware such as a board for implementing a network communication function.

Figure 8:
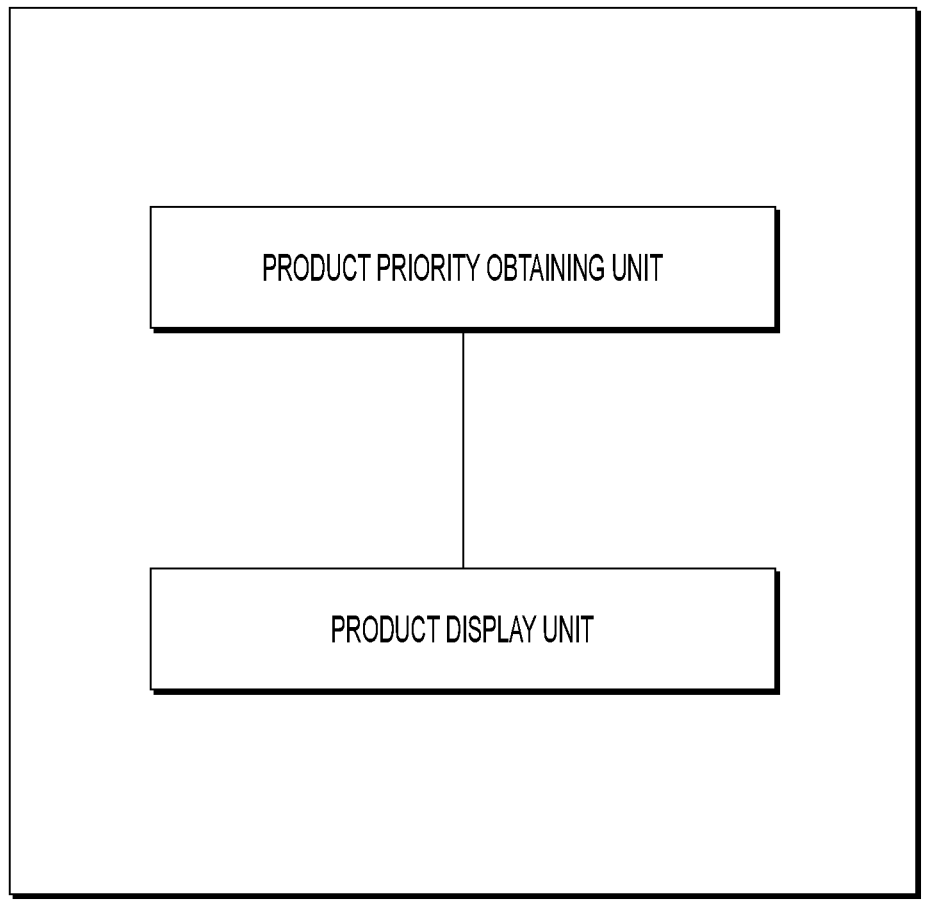
FIG. 8 is a logical structural diagram of an apparatus for displaying an online product on a product shelf, according to an implementation of the present disclosure.

FIG. 8 shows an apparatus for displaying an online product on a product shelf, according to an implementation of the present disclosure. The product shelf includes at least two display slots, and each display slot displays one online product. The apparatus includes a product priority obtaining unit and a product display unit. The product priority obtaining unit is configured to obtain online products waiting to be displayed and priorities of the online products. The product display unit is configured to display an online product with a higher priority on a display slot with a higher attention ranking position based on attention ranking of the display slots on the product shelf. The attention ranking of the display slots is determined based on a distance between the display slot and a visual center of the product shelf. The visual center of the product shelf is a golden section point in an upper left corner of a product shelf display area.

In an implementation, the attention ranking of the display slots is determined based on the distance between the display slot and the visual center of the product shelf and a degree of attention paid to the display slot on the product shelf.

In the earlier described implementation, the attention ranking of the display slots is determined in the following way: determining a first reference value of each display slot based on the distance between the display slot and the visual center of the product shelf; obtaining a second reference value of each display slot based on experimental data of the degree of attention paid to the display slot on the product shelf; and ranking the display slots based on a weighted sum of the first reference value and the second reference value of each display slot, to determine the attention ranking of the display slots.

The product shelf can include: a nine-rectangular-grid product shelf in which the display slots are arranged in three rows and three columns, where the display slots ranked in descending order of attention are: a display slot of row 1 and column 2, a display slot of row 2 and column 2, a display slot of row 3 and column 2, a display slot of row 1 and column 1, a display slot of row 1 and column 3, a display slot of row 2 and column 1, a display slot of row 2 and column 3, a display slot of row 3 and column 1, and a display slot of row 3 and column 3; an eight-rectangular-grid product shelf in which the display slots are arranged in two rows and four columns, where the display slots ranked in descending order of attention are: a display slot of row 1 and column 2, a display slot of row 1 and column 3, a display slot of row 2 and column 2, a display slot of row 2 and column 3, a display slot of row 1 and column 1, a display slot of row 1 and column 4, a display slot of row 2 and column 1, and a display slot of row 2 and column 4; and/or a six-rectangular-grid product shelf in which the display slots are arranged in three rows and two columns, where the display slots ranked in descending order of attention are: a display slot of row 1 and column 1, a display slot of row 1 and column 2, a display slot of row 2 and column 1, a display slot of row 2 and column 2, a display slot of row 3 and column 1, and a display slot of row 3 and column 2.

Optionally, the distance between the display slot and the visual center of the product shelf includes a distance between a geometric center of the display slot and the visual center of the product shelf.

In an example, an arrangement structure of the display slots on the product shelf is determined based on an aspect ratio of a display screen.

In the earlier described example, the arrangement structure of the display slots on the product shelf is determined based on the following conditions: When the aspect ratio of the display screen falls within a first ratio range, the display slots are arranged using a 3×3 nine-rectangular-grid product shelf; when the aspect ratio of the display screen falls within a second ratio range, the display slots are arranged using a 2×4 eight-rectangular-grid product shelf; and when the aspect ratio of the display screen neither falls within the first ratio range nor the second ratio range, the display slots are arranged using a 3×2 six-rectangular-grid product shelf. The first ratio range and the second ratio range do not overlap.

The previous descriptions are merely preferred implementations of the present disclosure, but are not intended to limit the present disclosure. Any modification, equivalent replacement, or improvement made without departing from the spirit and principle of the present disclosure shall fall within the protection scope of the present disclosure.

In a typical configuration, a computing device includes one or more central processing units (CPUs), an input/output interface, a network interface, and a memory.

The memory may include a non-persistent memory, a random access memory (RAM), and/or a non-volatile memory in a computer readable medium, for example, a read-only memory (ROM) or a flash memory (flash RAM). The memory is an example of the computer readable medium.

The computer readable medium includes persistent, non-persistent, movable, and unmovable media, and can store information using any method or technology. The information may be a computer readable instruction, a data structure, a program module, or other data. An example of the computer storage medium includes but is not limited to a phase change memory (PCM), a static random access memory (SRAM), a dynamic random access memory (DRAM), a random access memory (RAM) of another type, a read-only memory (ROM), an electrically erasable programmable read-only memory (EEPROM), a flash memory or another memory technology, a compact disc read-only memory (CD-ROM), a digital versatile disc (DVD) or other optical storage, a cassette magnetic tape, tape and disk storage or another magnetic storage device or any other non-transmission media that can be configured to store information that can be accessed by the computing device. As described in the present specification, the computer readable medium does not include a transitory computer readable medium (transitory media) such as a modulated data signal and a carrier.

It is further worthwhile to note that the term "include", "comprise", or any other variant is intended to cover a non-exclusive inclusion, so that a process, a method, a product, or a device that includes a list of elements not only includes those elements but also includes other elements which are not expressly listed, or further includes elements inherent to such process, method, product, or device. An element preceded by "includes a . . . " does not, without more constraints, preclude the existence of additional identical elements in the process, method, product, or device that includes the element.

Persons skilled in the art should understand that the implementations of the present disclosure can be provided as a method, a system, or a computer program product. Therefore, the present disclosure can use a form of hardware only implementations, software only implementations, or implementations with a combination of software and hardware. Moreover, the present disclosure can use a form of a computer program product that is implemented on one or more computer-usable storage media (including but not limited to a disk memory, a CD-ROM, an optical memory, etc.) that include computer-usable program code.

Figure 9:
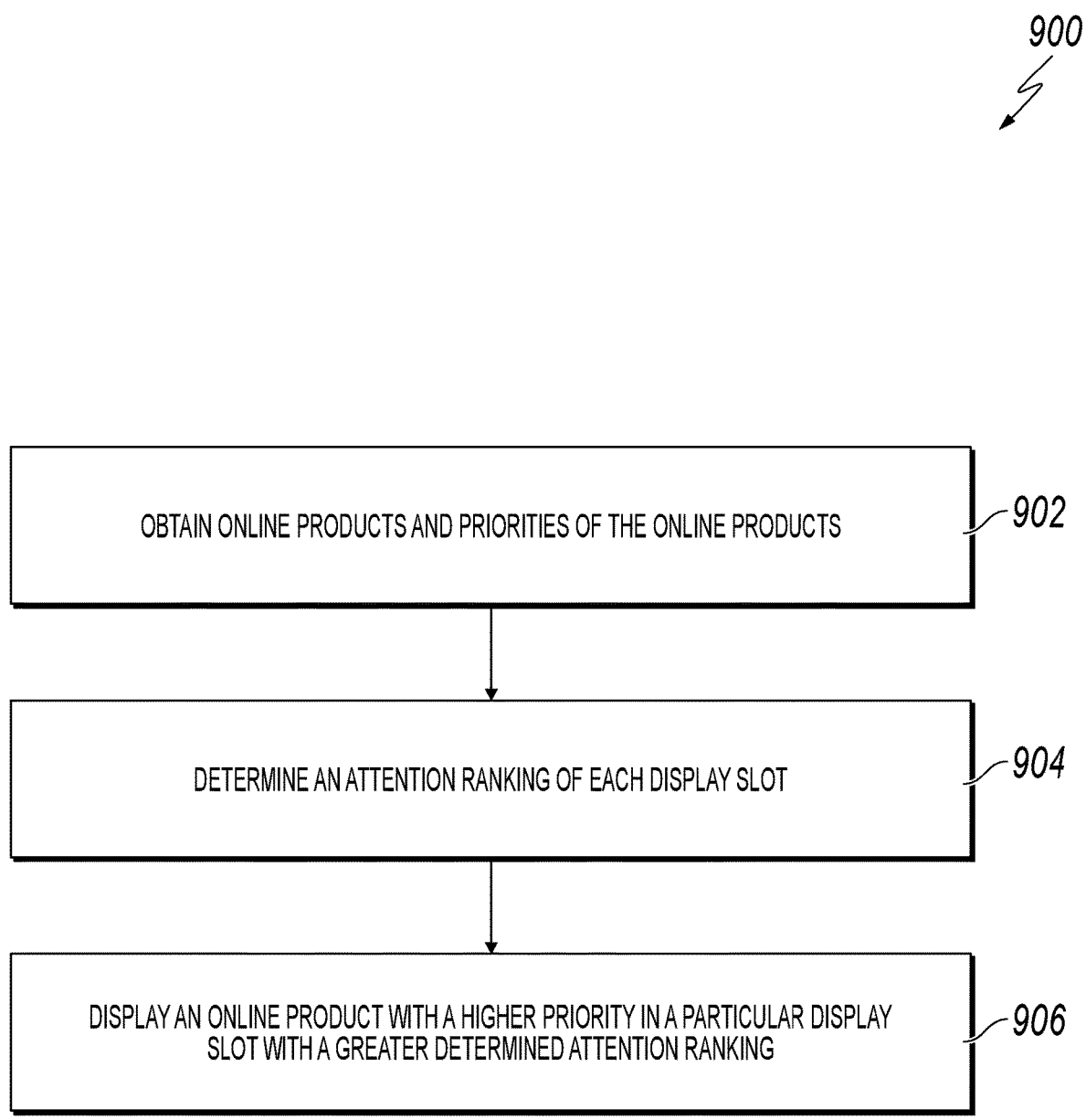
FIG. 9 is a flowchart illustrating an example of a computer-implemented method for displaying an online product on a product shelf, according to an implementation of the present disclosure.

FIG. 9 is a flowchart illustrating an example of a computer-implemented method 900 for displaying an online product on a product shelf, according to an implementation of the present disclosure. For clarity of presentation, the description that follows generally describes method 900 in the context of the other figures in this description. However, it will be understood that method 900 can be performed, for example, by any system, environment, software, and hardware, or a combination of systems, environments, software, and hardware, as appropriate. In some implementations, various steps of method 900 can be run in parallel, in combination, in loops, or in any order.

At 902, online products and priorities of the online products are obtained, where the online products are waiting to be displayed on a product shelf, and where the product shelf comprises at least two display slots. Each display slot of the at least two display slots displays one online product. In some implementations, an arrangement structure of the at least two display slots on the product shelf is determined based on an aspect ratio of a display screen. In some implementations, the arrangement structure of the at least two display slots on the product shelf is determined based on: if the aspect ratio of the display screen falls within a first ratio range, the at least two display slots are arranged using a 3×3 nine-rectangular-grid product shelf, if the aspect ratio of the display screen falls within a second ratio range, the at least display slots are arranged using a 2×4 eight-rectangular-grid product shelf, or if the aspect ratio of the display screen falls neither within the first ratio range nor the second ratio range, the at least two display slots are arranged using a 3×2 six-rectangular-grid product shelf, wherein the first ratio range and the second ratio range do not overlap. From 902, method 900 proceeds to 904.

At 904, an attention ranking of each display slot is determined based on a distance between each display slot and a visual center of the product shelf. In some implementations, the visual center of the product shelf is a golden section point in an upper left corner of a product shelf display area. In some implementations, the distance between each display slot and the visual center of the product shelf comprises a distance between a geometric center of each display slot and the visual center of the product shelf. In some implementations, the determination of the attention ranking of each display slot includes a degree of attention paid to each display slot on the product shelf. In some implementations, the determination of the attention ranking of each display slot comprises: determining a first reference value of each display slot based on the distance between each display slot and the visual center of the product shelf; obtaining a second reference value of each display slot based on experimental data of the degree of attention paid to each display slot on the product shelf; and ranking, as the attention ranking, each display slot based a weighted sum of the first reference value and the second reference value. From 904, method 900 proceeds to 906.

At 906, an online product with a higher obtained priority is displayed in a particular display slot with a greater determined attention ranking. After 906, method 900 stops.

Implementations of the subject matter described in this specification can be implemented so as to realize particular advantages or technical effects. For example, implementations of the subject matter permit enhancement of data visualization on a computer display. For example, an online product shelf is usually displayed to a user in a rectangular display area. When the user views the product shelf, a golden section point in an upper left corner of the rectangular display area of the product shelf is usually within an initial visual center of the user's vision. Therefore, an online product with a determined higher priority can be placed in a location closer to the initial visual center of the user's vision, based on such visual characteristics of the human eyes. In this way, data display and visualization on the computer display is enhanced.

The described methodology can ensure the efficient usage of computer resources (for example, processing cycles, network bandwidth, and memory usage), through efficient display of data on a computer display (for example, of a computer display of a mobile computing device). Efficient display of data and use of graphical user interfaces can minimize or prevent waste of available computer resources with respect to preventing undesired, invalid, or delayed transactions. Instead of users needing to perform multiple or protracted transactions (for example, searches), transaction efficiency can be enhanced, increasing transaction speed, reducing data usage, and reducing network bandwidth, network congestion, computational cycles (for example, both on clients and servers), and data storage requirements (either persistent or transitory).

In some implementations, elements of a graphical user interface associated with the described software application executing on the user equipment can be positioned to be least obtrusive for a user. For example, the elements can be positioned in a way to obscure the least amount of data and to avoid covering any critical or often-used graphical user interface elements).

Embodiments and the operations described in this specification can be implemented in digital electronic circuitry, or in computer software, firmware, or hardware, including the structures disclosed in this specification or in combinations of one or more of them. The operations can be implemented as operations performed by a data processing apparatus on data stored on one or more computer-readable storage devices or received from other sources. A data processing apparatus, computer, or computing device may encompass apparatus, devices, and machines for processing data, including by way of example a programmable processor, a computer, a system on a chip, or multiple ones, or combinations, of the foregoing. The apparatus can include special purpose logic circuitry, for example, a central processing unit (CPU), a field programmable gate array (FPGA) or an application-specific integrated circuit (ASIC). The apparatus can also include code that creates an execution environment for the computer program in question, for example, code that constitutes processor firmware, a protocol stack, a database management system, an operating system (for example an operating system or a combination of operating systems), a cross-platform runtime environment, a virtual machine, or a combination of one or more of them. The apparatus and execution environment can realize various different computing model infrastructures, such as web services, distributed computing and grid computing infrastructures.

A computer program (also known, for example, as a program, software, software application, software module, software unit, script, or code) can be written in any form of programming language, including compiled or interpreted languages, declarative or procedural languages, and it can be deployed in any form, including as a stand-alone program or as a module, component, subroutine, object, or other unit suitable for use in a computing environment. A program can be stored in a portion of a file that holds other programs or data (for example, one or more scripts stored in a markup language document), in a single file dedicated to the program in question, or in multiple coordinated files (for example, files that store one or more modules, sub-programs, or portions of code). A computer program can be executed on one computer or on multiple computers that are located at one site or distributed across multiple sites and interconnected by a communication network.

Processors for execution of a computer program include, by way of example, both general—and special-purpose microprocessors, and any one or more processors of any kind of digital computer. Generally, a processor will receive instructions and data from a read-only memory or a random-access memory or both. The essential elements of a computer are a processor for performing actions in accordance with instructions and one or more memory devices for storing instructions and data. Generally, a computer will also include, or be operatively coupled to receive data from or transfer data to, or both, one or more mass storage devices for storing data. A computer can be embedded in another device, for example, a mobile device, a personal digital assistant (PDA), a game console, a Global Positioning System (GPS) receiver, or a portable storage device. Devices suitable for storing computer program instructions and data include non-volatile memory, media and memory devices, including, by way of example, semiconductor memory devices, magnetic disks, and magneto-optical disks. The processor and the memory can be supplemented by, or incorporated in, special-purpose logic circuitry.

Mobile devices can include handsets, user equipment (UE), mobile telephones (for example, smartphones), tablets, wearable devices (for example, smart watches and smart eyeglasses), implanted devices within the human body (for example, biosensors, cochlear implants), or other types of mobile devices. The mobile devices can communicate wirelessly (for example, using radio frequency (RF) signals) to various communication networks (described below). The mobile devices can include sensors for determining characteristics of the mobile device's current environment. The sensors can include cameras, microphones, proximity sensors, GPS sensors, motion sensors, accelerometers, ambient light sensors, moisture sensors, gyroscopes, compasses, barometers, fingerprint sensors, facial recognition systems, RF sensors (for example, Wi-Fi and cellular radios), thermal sensors, or other types of sensors. For example, the cameras can include a forward- or rear-facing camera with movable or fixed lenses, a flash, an image sensor, and an image processor. The camera can be a megapixel camera capable of capturing details for facial and/or iris recognition. The camera along with a data processor and authentication information stored in memory or accessed remotely can form a facial recognition system. The facial recognition system or one-or-more sensors, for example, microphones, motion sensors, accelerometers, GPS sensors, or RF sensors, can be used for user authentication.

To provide for interaction with a user, embodiments can be implemented on a computer having a display device and an input device, for example, a liquid crystal display (LCD) or organic light-emitting diode (OLED)/virtual-reality (VR)/augmented-reality (AR) display for displaying information to the user and a touchscreen, keyboard, and a pointing device by which the user can provide input to the computer. Other kinds of devices can be used to provide for interaction with a user as well; for example, feedback provided to the user can be any form of sensory feedback, for example, visual feedback, auditory feedback, or tactile feedback; and input from the user can be received in any form, including acoustic, speech, or tactile input. In addition, a computer can interact with a user by sending documents to and receiving documents from a device that is used by the user; for example, by sending web pages to a web browser on a user's client device in response to requests received from the web browser.

Embodiments can be implemented using computing devices interconnected by any form or medium of wireline or wireless digital data communication (or combination thereof), for example, a communication network. Examples of interconnected devices are a client and a server generally remote from each other that typically interact through a communication network. A client, for example, a mobile device, can carry out transactions itself, with a server, or through a server, for example, performing buy, sell, pay, give, send, or loan transactions, or authorizing the same. Such transactions may be in real time such that an action and a response are temporally proximate; for example an individual perceives the action and the response occurring substantially simultaneously, the time difference for a response following the individual's action is less than 1 millisecond (ms) or less than 1 second (s), or the response is without intentional delay taking into account processing limitations of the system.

Examples of communication networks include a local area network (LAN), a radio access network (RAN), a metropolitan area network (MAN), and a wide area network (WAN). The communication network can include all or a portion of the Internet, another communication network, or a combination of communication networks. Information can be transmitted on the communication network according to various protocols and standards, including Long Term Evolution (LTE), 5G, IEEE 802, Internet Protocol (IP), or other protocols or combinations of protocols. The communication network can transmit voice, video, biometric, or authentication data, or other information between the connected computing devices.

Features described as separate implementations may be implemented, in combination, in a single implementation, while features described as a single implementation may be implemented in multiple implementations, separately, or in any suitable sub-combination. Operations described and claimed in a particular order should not be understood as requiring that the particular order, nor that all illustrated operations must be performed (some operations can be optional). As appropriate, multitasking or parallel-processing (or a combination of multitasking and parallel-processing) can be performed.

What is claimed is:

1. A computer-implemented method, comprising:
    obtaining, by one or more processors, data representing online products and priorities of the online products, wherein the online products are products to be displayed by a display screen on a product shelf of the display screen;
    determining, by the one or more processors, an aspect ratio of the display screen as a ratio of a width to a height of the display screen;
    determining, by the one or more processors, that the aspect ratio of the display screen falls within a ratio range of a plurality of defined ratio ranges;
    arranging, by the one or more processors, display slots on the display screen using a grid corresponding to the ratio range;
    determining, by the one or more processors, a respective attention rank of each display slot based on a distance between each display slot and a visual center of the product shelf; and
    displaying, by a particular display screen of a particular display slot, an online product with a highest obtained priority in the particular display slot having a highest determined attention rank.

2. The computer-implemented method of claim 1, wherein the visual center of the product shelf is a golden section point in an upper left corner of a product shelf display area.

3. The computer-implemented method of claim 1, wherein the distance between each display slot and the visual center of the product shelf comprises a distance between a geometric center of each display slot and the visual center of the product shelf.

4. The computer-implemented method of claim 1, wherein determining the respective attention rank of each display slot comprises a degree of attention paid to each display slot on the product shelf.

5. The computer-implemented method of claim 4, wherein determining the respective attention rank of each display slot comprises:
    determining a first reference value of each display slot based on the distance between each display slot and the visual center of the product shelf;
    determining a second reference value of each display slot based on experimental data of the degree of attention paid to each display slot on the product shelf; and ranking, as the respective attention rank, each display slot based on a weighted sum of the first reference value of each display slot and the second reference value of each display slot.

6. The computer-implemented method of claim 1, wherein the grid comprises an arrangement structure comprising at least two display slots.

7. The computer-implemented method according to claim 6, wherein the arrangement structure of the at least two display slots on the product shelf is determined based on:
if the aspect ratio of the display screen falls within a first ratio range, the at least two display slots are arranged using a 3×3 nine-rectangular-grid product shelf,
if the aspect ratio of the display screen falls within a second ratio range, the at least two display slots are arranged using a 2×4 eight-rectangular-grid product shelf, or
if the aspect ratio of the display screen falls neither within the first ratio range nor the second ratio range, the at least two display slots are arranged using a 3×2 six-rectangular-grid product shelf, wherein the first ratio range and the second ratio range do not overlap.

8. A non-transitory, computer-readable medium storing one or more instructions executable by a computer system to perform operations comprising:
obtaining data representing online products and priorities of the online products, wherein the online products are products to be displayed by a display screen on a product shelf of the display screen;
determining an aspect ratio of the display screen as a ratio of a width to a height of the display screen;
determining that the aspect ratio of the display screen falls within a ratio range of a plurality of defined ratio ranges;
arranging display slots on the display screen using a grid corresponding to the ratio range;
determining a respective attention rank of each display slot based on a distance between each display slot and a visual center of the product shelf; and
displaying, by a particular display screen of a particular display slot, an online product with a highest obtained priority in the particular display slot having a highest determined attention rank.

9. The non-transitory, computer-readable medium of claim 8, wherein the visual center of the product shelf is a golden section point in an upper left corner of a product shelf display area.

10. The non-transitory, computer-readable medium of claim 8, wherein the distance between each display slot and the visual center of the product shelf comprises a distance between a geometric center of each display slot and the visual center of the product shelf.

11. The non-transitory, computer-readable medium of claim 8, wherein determining the respective attention rank of each display slot comprises a degree of attention paid to each display slot on the product shelf.

12. The non-transitory, computer-readable medium of claim 11, wherein determining the respective attention rank of each display slot comprises:
determining a first reference value of each display slot based on the distance between each display slot and the visual center of the product shelf;
determining a second reference value of each display slot based on experimental data of the degree of attention paid to each display slot on the product shelf; and
ranking, as the respective attention rank, each display slot based on a weighted sum of the first reference value of each display slot and the second reference value of each display slot.

13. The non-transitory, computer-readable medium of claim 8, wherein the grid comprises an arrangement structure comprising at least two display slots.

14. The non-transitory, computer-readable medium according to claim 13, wherein the arrangement structure of the at least two display slots on the product shelf is determined based on:
if the aspect ratio of the display screen falls within a first ratio range, the at least two display slots are arranged using a 3×3 nine-rectangular-grid product shelf,
if the aspect ratio of the display screen falls within a second ratio range, the at least two display slots are arranged using a 2×4 eight-rectangular-grid product shelf, or
if the aspect ratio of the display screen falls neither within the first ratio range nor the second ratio range, the at least two display slots are arranged using a 3×2 six-rectangular-grid product shelf, wherein the first ratio range and the second ratio range do not overlap.

15. A computer-implemented system, comprising:
one or more computers; and
one or more computer memory devices interoperably coupled with the one or more computers and having tangible, non-transitory, machine-readable media storing one or more instructions that, when executed by the one or more computers, perform one or more operations comprising:
obtaining data representing online products and priorities of the online products, wherein the online products are products to be displayed by a display screen on a product shelf of the display screen;
determining an aspect ratio of the display screen as a ratio of a width to a height of the display screen;
determining that the aspect ratio of the display screen falls within a ratio range of a plurality of defined ratio ranges;
arranging display slots on the display screen using a grid corresponding to the ratio range;
determining a respective attention rank of each display slot based on a distance between each display slot and a visual center of the product shelf; and
displaying, by a particular display screen of a particular display slot, an online product with a highest obtained priority in the particular display slot having a highest determined attention rank.

16. The computer-implemented system of claim 15, wherein the visual center of the product shelf is a golden section point in an upper left corner of a product shelf display area.

17. The computer-implemented system of claim 15, wherein the distance between each display slot and the visual center of the product shelf comprises a distance between a geometric center of each display slot and the visual center of the product shelf.

18. The computer-implemented system of claim 15, wherein determining the respective attention rank of each display slot comprises a degree of attention paid to each display slot on the product shelf.

19. The computer-implemented system of claim 18, wherein determining the respective attention rank of each display slot comprises:

determining a first reference value of each display slot based on the distance between each display slot and the visual center of the product shelf;

determining a second reference value of each display slot based on experimental data of the degree of attention paid to each display slot on the product shelf; and ranking, as the respective attention rank, each display slot based on a weighted sum of the first reference value of each display slot and the second reference value of each display slot.

20. The computer-implemented system of claim 15, wherein the grid comprises an arrangement structure comprising at least two display slots, and wherein the arrangement structure of the at least two display slots on the product shelf is determined based on:

if the aspect ratio of the display screen falls within a first ratio range, the at least two display slots are arranged using a 3×3 nine-rectangular-grid product shelf, if the aspect ratio of the display screen falls within a second ratio range, the at least two display slots are arranged using a 2×4 eight-rectangular-grid product shelf, or if the aspect ratio of the display screen falls neither within the first ratio range nor the second ratio range, the at least two display slots are arranged using a 3×2 six-rectangular-grid product shelf, wherein the first ratio range and the second ratio range do not overlap.

\* \* \* \* \*